Patented Nov. 9, 1948

2,453,317

UNITED STATES PATENT OFFICE 2,453,317

COPOLYMER OF ISOPROPENYL ACETATE AND VINYL CHLORIDE

Rudolph Leonard Hasche and Edward M. McMahon, Kingsport, Tenn., assignors to Eastman Kodak Company, Rochester, N. Y., a corporation of New Jersey No Drawing. Application September 3, 1947, Serial No. 772,020

17 Claims. (Cl. 260—86)

This invention relates to copolymers of isopropenyl acetate and vinyl chloride, and is a continuation of application S. N. 527,966, filed on March 24, 1944, now abandoned.

It is known that vinyl acetate and vinyl chloride, each of which can be homopolymerized to give resinous polymers, can also be copolymerized to give resinous copolymers which are quite different from mere mixtures of polymeric vinyl acetate and polymeric vinyl chloride. We have now found that isopropenyl acetate (1-propene-2-ol acetate), which is neither a vinyl compound nor can be homopolymerized to give a resinous polymer, can be copolymerized with vinyl chloride to give a highly useful resinous copolymer. Our new copolymers are generally softened by boiling water. They may be stabilized to heat by such stabilizers as calcium stearate.

It is, accordingly, an object of our invention to provide a new copolymer. A further object is to provide a process for preparing such a new copolymer. Other objects will become apparent hereinafter.

In accordance with our invention, we copolymerize isopropenyl acetate with vinyl chloride. The copolymerization is accelerated by heat, and by the polymerization catalysts which are known to accelerate the polymerization of vinyl compounds. Exemplary of such catalysts are the organic peroxides (e. g. benzoyl peroxide, acetyl peroxide and lauroyl peroxide), hydrogen peroxide, perborates (e. g. alkali metal perborates) and persulfates (e. g. alkali metal persulfates).

The temperature at which the copolymerization is effected may vary from 40° C. to 100° C. The copolymerization is carried out in a closed vessel under the existing vapor pressure of the mixture of monomers. The copolymerization can be carried out by the mass method. The reaction can also be carried out by the bead or emulsion method in which water or some other medium in which the monomers are insoluble is employed as a dispersing medium, with or without emulsifying agents. The emulsion method of copolymerization is particularly suitable where a large ratio of isopropenyl acetate to vinyl chloride is desired. The copolymerization can also be effected in the presence of a diluent. The diluent agent employed is advantageously a solvent for the copolymer. However, the diluent may be a solvent for the monomers but not for the copolymers, so that the copolymer separates during the reaction. Any desired ratio of isopropenyl acetate to vinyl chloride can be employed.

The following example will serve to illustrate our new resinous copolymers and the manner of obtaining the same.

Example I

Isopropenyl acetate and benzoyl peroxide, in the quantities indicated in the following tabulation, were placed in glass tubes and the tubes were then chilled in Dry Ice. Vinyl chloride, chilled to Dry-Ice temperature, was then added to the tubes and the tubes were sealed. After warming to room temperature, the tubes were thoroughly shaken in order to insure complete solution. The tubes were then placed in perforated iron pipes closed at each end and finally heated in a water bath at 60° C. After the copolymerizations were complete, the tubes were chilled in Dry Ice before opening. The following tabulation illustrates some of the copolymers which we have obtained, operating in this manner:

| Ratio of vinyl chloride to isopropenyl acetate | Percent by weight of chlorine in monomeric mixture | Percent by weight of chlorine found in copolymer | Relative viscosity in 1, 4-dioxane | Polymerization time | Percent by weight of benzoyl peroxide employed in polymerization |
|---|---|---|---|---|---|
|  |  |  |  | Hours |  |
| 80-20 | 45.9 | 44.8 | 1.0304 | 93 | 0.1 |
| 95-5 | 54.0 | 54.4 | 1.0065 | 41 | 0.1 |
| 92-8 | 52.2 | 51.7 | 1.0509 | 41 | 0.2 |
| 95-5 | 54.0 | 53.6 | 1.0375 | 41 | 0.5 |
| 87-13 | 49.4 | 49.2 | 1.0340 | 16 | 0.5 |

The copolymers thus obtained were tough and thermoplastic. The second-listed copolymer had the following physical properties:

Rockwell hardness --------------------------- 70.2
Elongation ---------------------------per cent-- 15.0
Tensile strength----------lbs. per sq. in-- 3,240
Flexural strength---------lbs. per sq. in-- 5,760
Impact---------------ft. lbs. per sq. in-- 12.50

The following example will serve to illustrate the emulsion method of preparing our isopropenyl acetate-vinyl chloride copolymer.

| Gms. vinyl chloride | Gms. isopropenyl acetate | Ratio of vinyl chloride to isopropenyl acetate | Percent $Bz_2O_2$ | T° C. | Heating Time | Result |
|---|---|---|---|---|---|---|
| 33 | 30 | 52-48 | 0.5 | 60 | 12 da-------- | Slightly viscous, dark brown. |
| 40 | 20 | 67-33 | 0.5 | 60 | 3 hrs-------- | Clear, colorless, viscous resin. |

Example II

Isopropenyl acetate and a polymerization catalyst, in the quantities indicated in the following tabulation, 0.5 gm. gum arabic, 100 ccs. of water, and 28 gms. of vinyl chloride were placed in glass tube, and the tube sealed. The tube was then placed in a water bath at 45° C. where the tube was continuously shaken for 5 days. At the end of this time, the tube was opened, the contents coagulated with aluminum sulfate, and the coagulated copolymer washed well with water. The washed copolymer was dissolved in acetone and the acetone solution poured into water to precipitate the copolymer. The copolymer was then dried and analyzed for chlorine. The following tabulation illustrates some of the copolymers which we have obtained operating in this manner:

when used in large amounts. To obtain the solid copolymer it is simply necessary to add a solvent to the reaction mixture, which dissolves the isopropenyl acetate but not the copolymer, e. g. ethyl alcohol or methyl alcohol. The solid copolymer also may be obtained by dissolving the reaction mixture in a solvent, such as acetone, and precipitating with a non-solvent for the polymer, such as aqueous methanol. The following tabulation shows the results obtained when relatively large proportions of iso-propenyl acetate to vinyl chloride are used, as described in Ex. 1 above:

It may be seen from the above tabulation that longer heating periods are required when the ratio of isopropenyl acetate to vinyl chloride approaches 1:1. However it is possible to obtain resins having properties similar to those described in Examples I and II merely by extracting excess isopropenyl acetate. Generally, in preparing our isopropenyl acetate-vinyl chloride copolymers, we use a monomeric mixture consisting of from 52 to 95 parts by weight of vinyl chloride to 5 to 48 parts by weight of isopropenyl acetate. Advantageously, we may use a monomeric mixture consisting of from 74 to 95 parts by weight of vinyl chloride to 5 to 26 parts by weight of isopropenyl acetate. A still more restricted range which we may use is from 80 to 95 parts by weight of vinyl chloride to 5 to 20 parts by weight of isopropenyl acetate. The per cent of chlorine

| Gms. Isopropenyl acetate | Gms. of Polymerization Catalyst | Wt. Ratio of vinyl chloride to isopropenyl acetate | Per cent by wt. of chlorine in monomeric mixture | Per cent by wt. of chlorine in copolymer | Per cent Yield | Equiv. per cent of vinyl chloride in copolymer | Ratio of vinyl chloride to isopropenyl acetate in copolymer | |
|---|---|---|---|---|---|---|---|---|
| | | | | | | | Wt. | Molar |
| 9.8 | 0.1 gm. benzoyl peroxide-------------- | 74-26 | 42.4 | 40.2 | 63 | 70.6 | 70.6-29.4 | 3.85-1 |
| 6.2 | 0.1 gm. $(NH_4)_2S_2O_8$-------------- | 80-20 | 46.0 | 46.6 | 91 | 82 | 82-18 | 7.3-1 |
| 9.8 | -----do-------- | 74-26 | 42.4 | 46.2 | 28 | 81.5 | 81.5-18.5 | 7-1 |
| 7.0 | -----do-------- | 80-20 | 46.0 | 38.3 | 31 | 67.4 | 67.4-32.6 | 3.31 |

The copolymers thus obtained were similar in properties to those prepared in Example 1, and were tough and thermoplastic.

Plasticizers can also be included in the monomeric mixture before copolymerization. For instance, copolymerization employing 87 parts by weight of vinyl chloride, 13 parts of isopropenyl acetate and 10 parts of di-n-octyl phthalate was effected. The copolymer was obtained after four days in a 60° water bath using 0.1 per cent by weight of benzoyl peroxide as polymerization catalyst. The plasticizer was compatible and made the copolymer softer than the above copolymers prepared without a plasticizer.

In the manner similar to that illustrated above in Example I or Example II, copolymers containing a large proportion of isopropenyl acetate to vinyl chloride can be prepared. If a relatively large ratio of isopropenyl acetate to vinyl chloride has been used, the resulting product may be only slightly viscous or may consist of the copolymer dissolved in the excess of isopropenyl acetate, which has a tendency to act as a solvent in the first product, or copolymer, may vary from about 38% to about 55% by weight, a more restricted range being from about 45 to about 55%.

Our new copolymers are valuable products for the purpose of molding. They can be molded by the usual compression or injection process, with or without plasticizers. Polymerization of the copolymers can be effected in molds so that the polymerized product has a definite shape. Solid masses of the copolymer can be worked by cutting, sawing, filing, etc. The copolymers can be worked into definite shapes by first softening with a suitable softening agent and then kneading, rolling compressing or drawing the softened product. The copolymers can also be extruded into various shapes such as wires or films. The copolymers can also be transformed into useful films by making a solution of the copolymer and then casting the solution on a film-forming surface such as a glass plate or a revolving drum, allowing the cast film to dry and then stripping the film from the surface. Solutions of our copolymer can also be extruded in a suitable form such as a fine thread into a drying atmosphere or into a precipitating bath.

Our new copolymers can be modified with plasticizers. Typical plasticizers are the following:

> Dibutyl phthalate
> Dibenzyl succinate
> Butoxyethyl tetrahydrofuroate
> Cyclohexyl acetate
> Diethylene glycol monobutyl ether
> Diethylene glycol dibutyrate
> Diethoxyethyl adipate
> Diethoxyethyl sebacate
> Ethylene glycol monobenzyl ether
> Dimethoxyethyl phthalate
> Ditetrahydrofurfuryl adipate
> Triacetin
> Tripropionin
> Triamyl phosphate
> Tributyl phosphate
> Triethylene glycol diacetate
> Triphenyl phosphate
> Camphor Modifying agents, such as non-drying oils, drying oils, semi-drying oils, natural resins, synthetic resins, waxes, cellulose derivatives, such as cellulose acetate, pigments, fillers, dyes, etc., can be added to our copolymers. When suitably plasticized, our new copolymers can be employed as a laminating material for the preparation of safety glass. The softer copolymers are more suitable for this purpose.

When our copolymers are polymerized incompletely to give a syrupy mass, the mass is useful as an impregnating agent for porous substances, such as paper or textiles and also as a cement for cementing together surfaces such as the glass surfaces of lenses. These syrupy masses can be applied to various articles, such as set forth above and then subjected to a heat treatment in order to complete the polymerization.

We claim:

1. A resinous copolymer of isopropenyl acetate and vinyl chloride containing 38 to 54% by weight of chlorine, said copolymer having been prepared from a monomeric mixture consisting of isopropenyl acetate and vinyl chloride.

2. A resinous copolymer of isopropenyl acetate said vinyl chloride containing 45 to 54% by weight of chlorine, said copolymer having been prepared from a monomeric mixture consisting of isopropenyl acetate and vinyl chloride.

3. A resinous copolymer of isopropenyl acetate and vinyl chloride containing 45% by weight of chlorine, said copolymer having been prepared from a monomeric mixture consisting of isopropenyl acetate and vinyl chloride.

4. A resinous copolymer of isopropenyl acetate and vinyl chloride containing 49% by weight of chlorine, said copolymer having been prepared from a monomeric mixture consisting of isopropenyl acetate and vinyl chloride.

5. A resinous copolymer of isopropenyl acetate and vinyl chloride containing 54% by weight of chlorine, said copolymer having been prepared from a monomeric mixture consisting of isopropenyl acetate and vinyl chloride.

6. A process for preparing a resinous copolymer comprising subjecting to polymerization in the presence of a peroxide polymerization catalyst a mixture consisting of from 52 to 95 parts by weight of vinyl chloride and from 5 to 48 parts by weight of isopropenyl acetate.

7. A process for preparing a resinous copolymer comprising subjecting to polymerization in the presence of an organic peroxide polymerization catalyst a mixture consisting of from 52 to 95 parts by weight of vinyl chloride and from 5 to 48 parts by weight of isopropenyl acetate.

8. A process for preparing a resinous copolymer comprising subjecting to polymerization in the presence of benzoyl peroxide a mixture consisting of from 52 to 95 parts by weight of vinyl chloride and from 5 to 48 parts by weight of isopropenyl acetate.

9. A process for preparing a resinous copolymer comprising subjecting to polymerization in the presence of an inorganic peroxide catalyst a mixture consisting of from 52 to 95 parts by weight of vinyl chloride and from 5 to 48 parts by weight of isopropenyl acetate.

10. A process for preparing a resinous copolymer comprising subjecting to polymerization in the presence of a peroxide polymerization catalyst a mixture consisting of from 74 to 95 parts by weight of vinyl chloride and from 5 to 26 parts by weight of isopropenyl acetate.

11. A process for preparing a resinous copolymer comprising subjecting to polymerization in the presence of an organic peroxide polymerization catalyst a mixture consisting of from 74 to 95 parts by weight of vinyl chloride and from 5 to 26 parts by weight of isopropenyl acetate.

12. A process for preparing a resinous copolymer comprising subjecting to polymerization in the presence of benzoyl peroxide a mixture consisting of from 74 to 95 parts by weight of vinyl chloride and from 5 to 26 parts by weight of isopropenyl acetate.

13. A process for preparing a resinous copolymer comprising subjecting to polymerization in the presence of an organic peroxide catalyst a mixture consisting of from 74 to 95 parts by weight of vinyl chloride and from 5 to 26 parts by weight of isopropenyl acetate.

14. A process for preparing a resinous copolymer comprising subjecting to polymerization in the presence of a peroxide polymerization catalyst a mixture consisting of from 80 to 95 parts by weight of vinyl chloride and from 5 to 20 parts by weight of isopropenyl acetate.

15. A process for preparing a resinous copolymer comprising subjecting to polymerization in the presence of an organic peroxide polymerization catalyst a mixture consisting of from 80 to 95 parts by weight of vinyl chloride and from 5 to 20 parts by weight of isopropenyl acetate.

16. A process for preparing a resinous copolymer comprising subjecting to polymerization in the presence of benzoyl peroxide a mixture consisting of from 80 to 95 parts by weight of vinyl chloride and from 5 to 20 parts by weight of isopropenyl acetate.

17. A process for preparing a resinous copolymer comprising subjecting to polymerization in the presence of an inorganic peroxide polymerization catalyst a mixture consisting of from 80 to 95 parts by weight of vinyl chloride and from 5 to 20 parts by weight of isopropenyl acetate.

RUDOLPH LEONARD HASCHE.
EDWARD M. McMAHON.

No references cited.

Certificate of Correction

Patent No. 2,453,317.                                                        November 9, 1948.

RUDOLPH LEONARD HASCHE ET AL.

It is hereby certified that errors appear in the printed specification of the above numbered patent requiring correction as follows:

Columns 3 and 4, Example II, in the table thereof, last line, under the heading "Molar" for the numeral "3.31" read *3.3–1*; column 5, line 49, claim 2, for the word "said" before "vinyl" read *and*;

and that the said Letters Patent should be read with these corrections therein that the same may conform to the record of the case in the Patent Office.

Signed and sealed this 26th day of April, A. D. 1949.

[SEAL]

THOMAS F. MURPHY,
                                                           *Assistant Commissioner of Patents.*